United States Patent
Whicker, Jr.

[11] Patent Number: 5,832,867
[45] Date of Patent: Nov. 10, 1998

[54] GROUND POSITION INDICATOR AND SIGNALING DEVICE

[76] Inventor: Charles N. Whicker, Jr., Rte. 3, Box 609X, Harriman, Tenn. 37748

[21] Appl. No.: 261,772

[22] Filed: Jun. 20, 1994

[51] Int. Cl.[6] .................................................. E01F 9/04
[52] U.S. Cl. .......................... 116/209; 116/63 P; 40/217; 40/606
[58] Field of Search ................. 116/63 R, 63 P, 116/209, 210, 211; 40/212, 217, 606; 244/114 R; 33/755, 19.3

[56] References Cited

U.S. PATENT DOCUMENTS

| | | | |
|---|---|---|---|
| 1,507,191 | 9/1924 | Ladd | 40/217 |
| 1,847,739 | 3/1932 | Wilhelm | 40/217 |
| 1,937,374 | 11/1933 | Wolff | 40/217 |
| 2,455,721 | 12/1948 | Abiuso | 40/217 |
| 2,920,846 | 1/1960 | Lingafelter . | |
| 3,334,554 | 8/1967 | Adams | 116/63 P |
| 3,456,909 | 7/1969 | Wainwright . | |
| 3,489,380 | 1/1970 | Vanderlip . | |
| 3,649,724 | 3/1972 | Rembert et al. . | |
| 3,668,781 | 6/1972 | Teter | 33/1 H |
| 4,019,271 | 4/1977 | Latimer | 116/173 |
| 4,197,808 | 4/1980 | Kinninger | 40/612 |
| 4,202,646 | 5/1980 | Herstad . | |
| 4,344,231 | 8/1982 | Martinez | 33/1 G |
| 4,687,369 | 8/1987 | McDonald | 116/63 P |
| 4,792,258 | 12/1988 | Goff | 116/63 P |
| 4,817,318 | 4/1989 | Strauch | 40/612 |
| 4,892,272 | 1/1990 | Hadzicki | 244/153 R |
| 5,245,943 | 9/1993 | Hull et al. | 116/210 |
| 5,325,798 | 7/1994 | Nowell et al. | 33/1 H |
| 5,330,199 | 7/1994 | Vand | 273/400 |
| 5,333,391 | 8/1994 | Eldridge et al. | 33/1 H |

Primary Examiner—Diego F. F. Gutierrez
Assistant Examiner—Andrew Hirshfeld
Attorney, Agent, or Firm—Luedeka, Neely and Graham, P.C.

[57] ABSTRACT

This invention provides a combination of ground position indicator and aircraft signaling devices for airborne personnel. The disclosed position indicator and signaling devices include a substantially pliable mesh web for deployment upon the ground, the web having a directional indicator and a color or other devices for contrast between the web and the ground so that the web is highly visible to airborne personnel who are in an overhead position adjacent to the ground upon which the web is deployed.

22 Claims, 4 Drawing Sheets

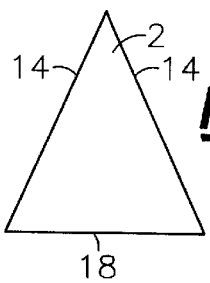
Fig. 1
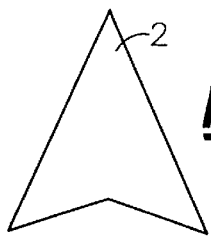
Fig. 2
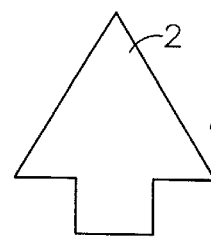
Fig. 3
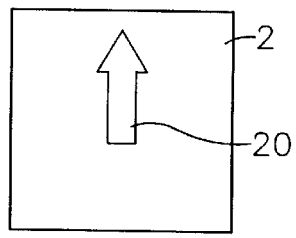
Fig. 4
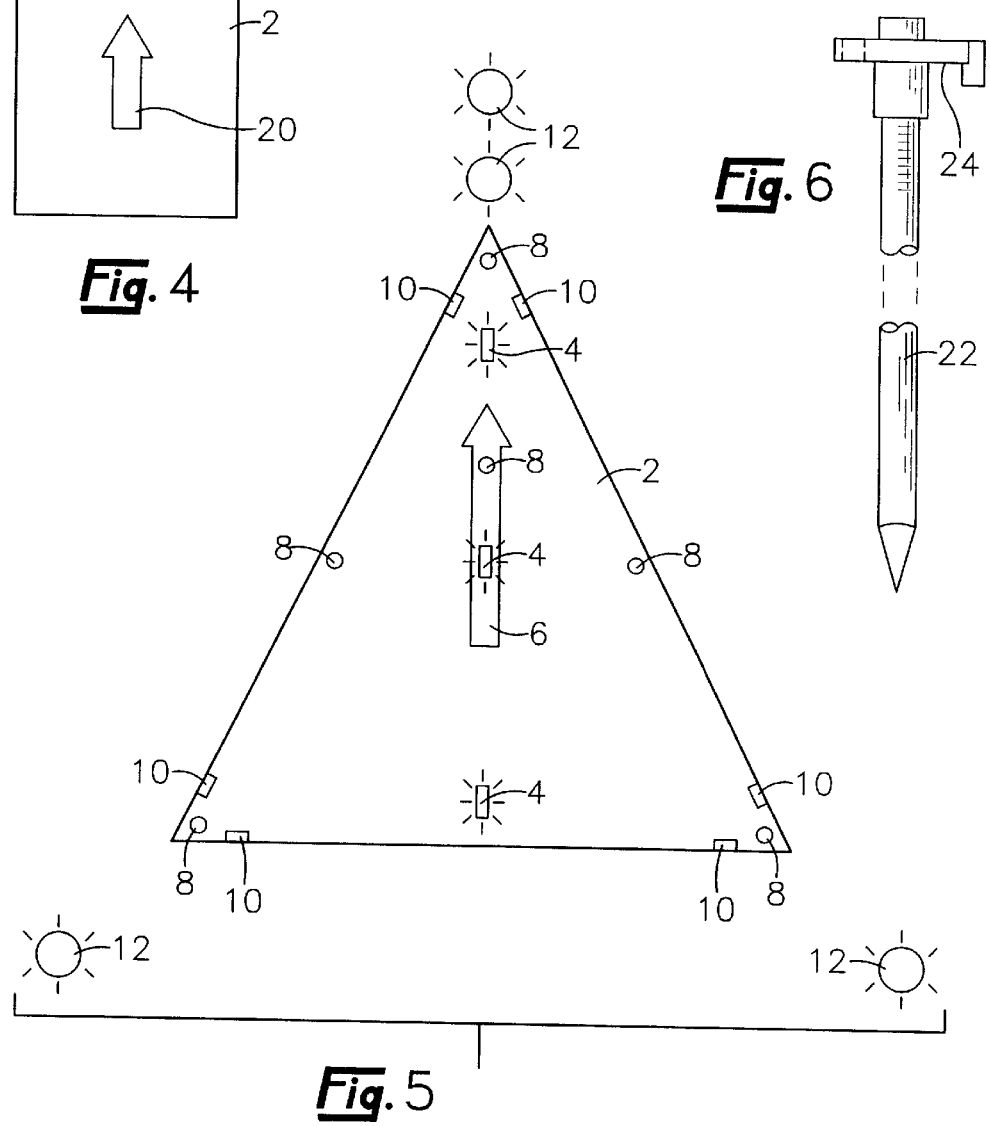
Fig. 5
Fig. 6

GROUND POSITION INDICATOR AND SIGNALING DEVICE

FIELD OF THE INVENTION

This invention relates to a readily transportable device and associated kit for signaling airborne personnel and for indicating ground position and direction for rescue and retrieval of people or equipment in remote terrestrial locations.

BACKGROUND OF THE INVENTION

Unfortunately, people sometimes become lost or stranded in remote wilderness areas. For example, hikers and skiers may become lost or stranded in mountainous or remote areas, sometimes because of over adventurousness and sometimes as a result of sudden weather changes. People also become stranded in remote areas due to accidents such as plane crashes or breakdown of recreational vehicles. Whatever the cause, there is typically a rapid mobilization of emergency personnel in a search and rescue mission once there is a strong suspicion of a lost or stranded person. Often, the terrain is such that the search must be undertaken with the searchers dispersed over a wide area, sometimes on foot or in all-terrain vehicles. When a lost or stranded person is located, search personnel will typically notify rescue personnel by radio that the person has been located and attempt to identify the location so that a helicopter may be dispatched. However, it is not always possible to communicate by radio, and the location may not be readily identifiable by the searcher. Thus, in many cases there exists a need to signal the location to airborne parties. Many devices have been used for this purpose, such as flares and lights, but all known signaling devices suffer from some drawbacks. For example, flares alone are temporary, and are therefore not suitable in many cases. Conventional lighting may not be effective in the daylight hours or under certain weather conditions. Also, conventional signaling devices may not be conveniently or reliably stowed for transport and deployment.

Accordingly, it is an object of the invention to provide a ground position indicator and signaling device.

It is another object of the invention to provide a device of the character described which is useful in indicating location, direction and landing feasibility to helicopters.

Another object of the invention is to provide a ground position signaling device and associated kit which is readily transportable by search personnel to remote locations and which is conveniently and quickly deployable with a minimum of skill to provide a highly visible, reliable signal to airborne rescue personnel.

SUMMARY OF THE INVENTION

The present invention relates to a ground position indicator and signaling device for airborne personnel which comprises a substantially pliable web for deployment upon the ground. The web includes means for indicating direction and means for contrast between the web and the ground, which contrast means is highly visible to airborne personnel who are in an overhead position adjacent to the ground upon which the web is deployed. Also included is ground securement means for securing the web to the ground and a container for storing and enabling transport of the web and ground securement means to a remote location.

A key feature of this invention is that the indicator and signaling device is provided in a form which can be readily transported to remote locations without the need for motorized conveyance. The apparatus of this invention is especially well suited for terrestrial locations which require accessibility by helicopter for rescue and/or retrieval of personnel and/or equipment.

In a particularly preferred embodiment, the invention provides a portable ground position indicator apparatus and signaling device for airborne personnel comprising, in combination, a substantially pliable fiberglass mesh web for deployment upon ground containing, means for indicating direction and means for providing a contrast between the web and the ground, which contrast means provides a high degree of visibility to airborne personnel who are in an overhead position adjacent to the ground upon which the web is deployed. Ground securement means substantially secure the web to the ground. A container is included for storing and readily transporting the web and ground securement means to remote locations.

The pliable web used for direction indication may be formed from any resilient, preferably tear resistant material such as polyethylene, canvas, vinyl, fiberglass, natural or synthetic fibers, such as cotton, nylon, rayon, wool, and the like. It is preferred that the web be constructed in such a fashion that its tendency to form a sail due to air movement with respect to the web is greatly reduced. Accordingly, it is especially preferred that the web be a relatively heavy, open weave material, most preferably fiberglass mesh. The open weave fiberglass material should be of a weight and thickness that will provide tear resistance yet be readily transportable by one person. It is not necessary that the web be tear resistant or reusable, but a tear resistant, reusable web is highly desirable from an economic point of view.

The web should preferably be large enough to be seen from at least an elevation of about 3000 feet and contain a means for indicating direction. The direction-indicating means may be provided either by the shape of the web, by placement on the web of a contrasting arrow which arrow may also be made from the same or a different web-like, pliable material which contrasts greatly with respect to the color and reflectivity of the web, or both. When the shape of the web is used for determining direction it is preferred that the web have a substantially triangular shape wherein the length of two sides of the triangle is substantially greater than the length of the base of triangle. A particular preferred substantially triangular shape will have a length ratio of sides to base of at least about 1.5:1. The web may also be formed in a substantially equilateral triangular shape with a contrasting color in a corner to act as a pointer and the triangular-shaped web may also include the before mentioned highly visible contrasting arrow. Other suitable direction indicator devices which may be attached to the web include, but are not limited to illuminating devices such as reflective tape and/or electrically powered lights or beacons.

Another desirable feature of the web is that it contains a means for contrast between the web and the ground upon which it is deployed. This contrast means should be sufficient to provide a high degree of visibility to airborne personnel from an overhead position adjacent to the ground upon which the web is deployed. By "visibility" I refer to visibility from an overhead distance of preferably at least about 3000 feet. Any number of contrast means may be used including illuminating devices such as electrically powered lights and beacons, reflective tape and the like. The color of the web may also be used to provide a contrast means between the web and the ground. Suitable colors include orange, fluorescent green, red, yellow, white and the like provided the color selected for the web and the color of the adjacent ground upon which the web is deployed contrast sufficiently for the purposes of this invention. When the web contains a direction indicating arrow, the color of the arrow should be selected such that it also contrasts with the web. For example, the arrow may be white, yellow or black when the web is orange or red.

When illuminating devices are used as a contrast means such devices may be fixedly or removably attached to the web. Methods for attaching such illuminating devices to the web include VELCRO® fasteners, straps, double-sided tape, brackets, clamps, bolts, or any other well known means for securing such illuminating devices to a web.

After deployment on the ground the web is preferably secured to the ground to prevent movement due to air currents adjacent to the web. The ground securement means may include any number of devices such as ropes, stakes, and masses for securing the web in its deployed position on the ground. A particularly preferred securement means comprises a plurality of apertures in the web and a plurality of a rigid elongate members for insertion through the apertures in the web and into the ground. The rigid elongate members may be hammered or pushed into the ground and preferably have appended thereto a hold-down member for attachment to the web. While it is preferred to reinforce the apertures in the web with grommets when using such rigid elongate members, such reinforcement is not necessary to the invention. As an alternative to having apertures in the web, the rigid elongate members may be attached to the web by straps, buckles, bolts, or the like.

When masses are used as a securement means, the masses are selected from weights sufficient to suitably hold the web in its deployed position. The masses may be attached to the web by straps, buckles, bolts, adhesive, tape and the like. The masses may be of any shape including, but not limited to, weighted bag masses which bag masses may be filled at the deployment site with weighted materials such as sand, rocks, gravel or any other weighing materials found at the site.

The container for the web and securement means is preferably a pack which may be carried on the back with shoulder straps, specially adapted to contain the web and other elements of the apparatus.

Another feature of the invention involves inclusion of means for measuring a landing perimeter relative to the web, wherein a helicopter may be reasonably assured that landing upon the web will not involve the blades of the helicopter with surrounding trees or terrain. Preferably, such measuring means include a tape and means for attaching one end of the tape to the ground so that the tape may be extended to a predetermined distance from the attached end of the tape and the user may walk in a circular pattern to ensure that there is sufficient clearance for landing.

Accordingly, the invention not only provides for indication of a safe landing area for aircraft, particularly helicopters, but it also provides a position indicator for specifying the direction for retrieval of personnel and/or equipment. Furthermore, the invention provides suitable safety and signaling equipment for such airborne personnel in a portable container. Other features of the invention will be evident from the drawings and appended claims.

DESCRIPTION OF THE DRAWINGS

FIGS. 1, 2, 3, and 4 are top plain view illustrations, not to scale, of configuration of various suitable web position indicator and signaling devices.

FIG. 5 is a top plain view illustration, not to scale, of a preferred deployment of the position indicator and signaling device of this invention.

FIG. 6 is a side elevational view, not to scale, of a preferred ground securement means for the web position indicator and signal device of this invention.

DETAILED DESCRIPTION OF PREFERRED EMBODIMENTS

Figure 7:
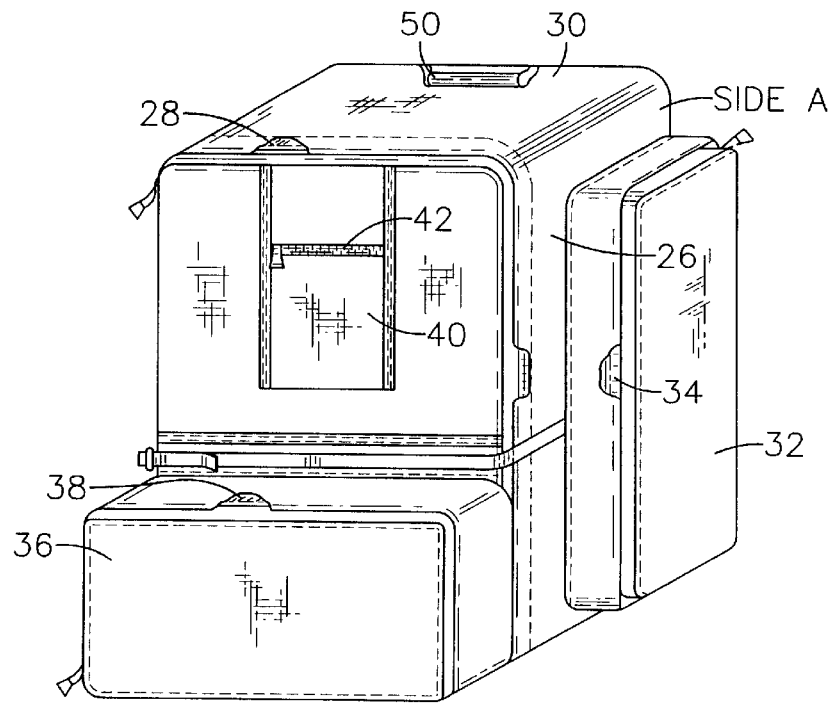
FIGS. 7 and 8 are respective views, not to scale of a typical storage container for the ground position indicator and signaling device of this invention.

In order to more fully describe the features of the invention reference is now made to the drawings which provide further illustration of various details of the invention. FIGS. 1–4 illustrate various suitable configurations for the web. In FIG. 1 web 2 is substantially triangular shaped wherein sides 14 have a length ratio relative to side 18 of greater than 1:1 and most preferably greater than 1.5:1. FIGS. 2 and 3 illustrate other web configurations wherein the web 2 is substantially arrow-shaped. As illustrated in FIG. 4, web 2 may also be rectangular shaped provided it contains a direction indicating means 20. As can be seen from the foregoing illustrations many variations for the shape of the web may be used provided the web has or is modified to contain a suitable means for indicating direction.

FIG. 5 is given to illustrate various other features of the invention. In FIG. 5 web 2 is deployed upon the ground in a manner to indicate the direction for search, rescue, and/or retrieval of equipment. The directional deployment may also be used to indicate a suitable wind direction for landing of helicopter personnel. In this illustration, the web 2 has imposed thereon contrasting arrow 6 for direction indication. Illuminating devices may also be attached to the web to provide or increase the contrast between the web and the ground or for use in signaling at night. Such illuminating devices may be electrically powered lights or beacons 4 or reflective tape 10 or a combination of both electrically powered lights or beacons 4 and reflective tape 10. The number and positions of the illuminating devices attached to the web is not critical to the invention. Furthermore, the illuminating devices may be attached to the web in any convenient or appropriate manner. When used, reflective tape 10 is typically placed at the edges of the web 2 in order to increase the visibility of the web from an overhead location.

As illustrated in FIG. 5, the web 2 may contain apertures 8 for use with the securement device depicted in FIG. 6. The number and location of the apertures 8 in the web is not critical to the invention but should be sufficient to prevent movement of the web once it is deployed upon the ground.

FIG. 5 also illustrates the use of one or more accessory illuminating devices 12, remotely disposed relative to the web 2 in order to enhance the nighttime visibility of the web 2 and/or provide indication of a safe landing zone and/or direction for helicopter personnel. The illuminating device 12 is preferably one or more high intensity strobe lights and/or high powered beacons. Such illumination devices 12 are preferably battered powered.

Now referring to FIG. 6, the rigid elongate member 22 for insertion through the apertures in the web 2 is illustrated. The rigid elongate member 22 may contain a pendant attachment device 24 for securing the web to the rigid elongate member. Such rigid elongated member 22 may be hammered or pushed into the ground through the apertures in the web.

Figure 8:
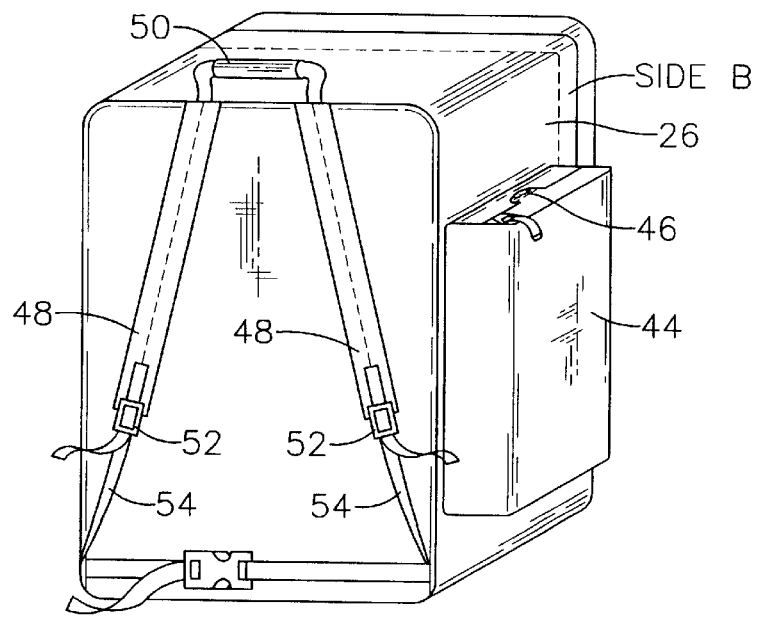

FIGS. 7 and 8 illustrate a typical container device 26 for storing and transporting the ground position indicator and other elements of the apparatus of this invention. FIG. 7 illustrates a front view of the container device 26 with a closure device 28 for opening and insertion of the web into the large compartment area 30 of container 26. Also illustrated is side compartment 32 having closure 34 for storing one or more illuminating devices for use with the apparatus of this invention. Compartment 36 having closure 38 is a utility compartment for carrying various auxiliary equipment such as tape measure, hammer, batteries, and the like. Compartment 40 having closure 42 is utilized for various manuals and instructional material for deployment of the ground position indicating device.

FIG. 8, depicts view from the rear of storage container 26. Compartment 44 on the opposite side of container 26 from compartment 32 having closure 46 may be used for storing one or more ground securement means and/or wind direction means. Shoulder straps 48 attached on their upper ends to container 26 provide for easy transportation of container 26 by one person. The shoulder straps 48 may be adjustably disposed relative to container 26 and as such may contain an adjustment device, 52, attached to a slidable member 54 which in turn is fixedly attached to container 26 on its lower end. Handle 50 may also be provided for readily lifting container 26. While FIGS. 7 and 8 provide preferred embodiments of the invention other variations may be utilized for the container 26 provided it is sufficiently disposed for storing and transporting the web and any other desired or useful accessory equipment which may be utilized with the ground position indicator of this invention.

Figure 9:
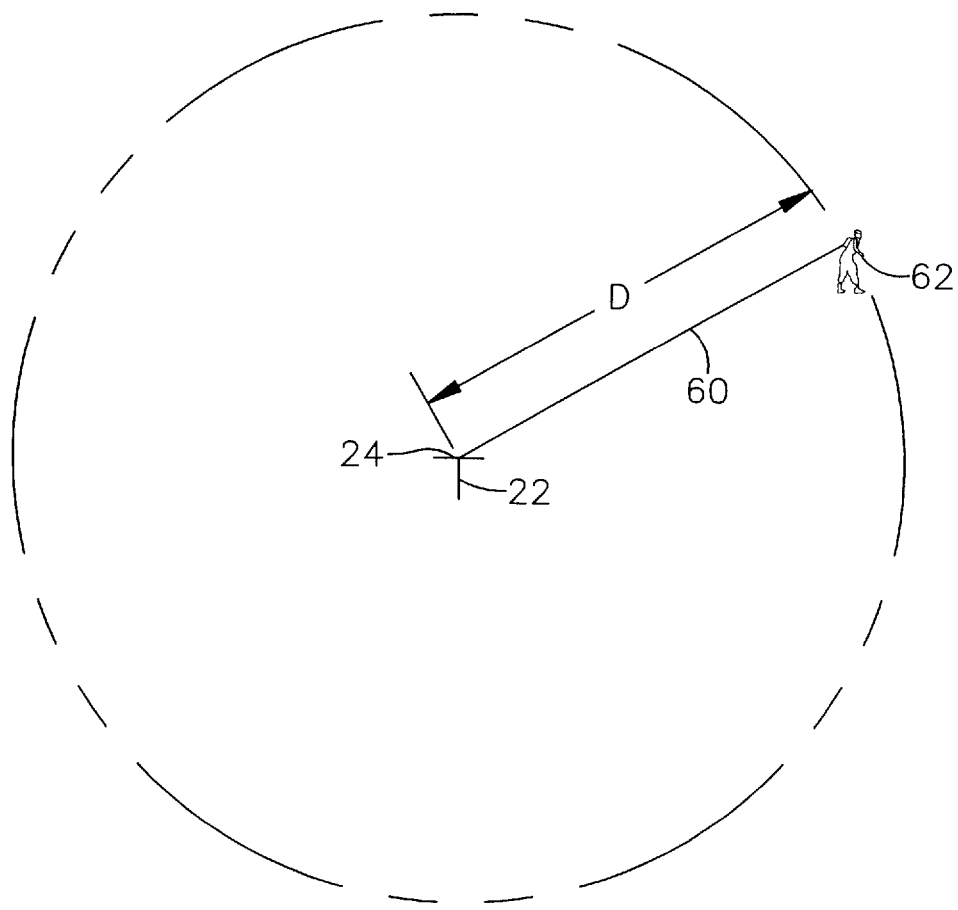
FIG. 9 is an overhead plain view, not to scale of the method used to select a safe landing area for helicopter personnel.

FIG. 9 illustrates a method for determining a safe landing zone for helicopters. In this illustration, a retractable measuring device 60 may be removably attached to attachment device 24 of rigid elongate member 22 after disposing the elongate member 22 into the ground. A person 62 would then extend the measuring device a predetermined distance D from the elongate member 22. By walking in a circular direction while maintaining the predetermined distance D, an area would be circumscribed radically distant from the elongate member 22. In such a manner an area free of trees and other interfering objects for safe landing of a helicopter may be determined. The position of the rigid elongate member 22 may then be used as a focal point for deploying the web. Typically, the rigid elongate member 22 would be used to secure the center of the web to the ground. In the alternative, the web may be deployed in a suitable area but not secured to the ground until a safe landing area has been determined using measuring device 60.

For the purposes of this invention, the measuring device 60 may be a tape measure having a length which will allow it to be extended a predetermined distance beyond the sweep of helicopter blades. For large helicopters that distance may be about 85 feet during the day and about 145 ft. at night. For smaller helicopters, a distance of about 55 feet during the day and 90 ft. at night may be sufficient.

In addition to the above devices, the apparatus of this invention may also include a wind direction indicator for use in safely landing airborne personnel, particularly helicopter personnel. The wind direction indicator may be a flare, wind sock or any other wind direction indicator readily known to those in the art.

Figure 10:
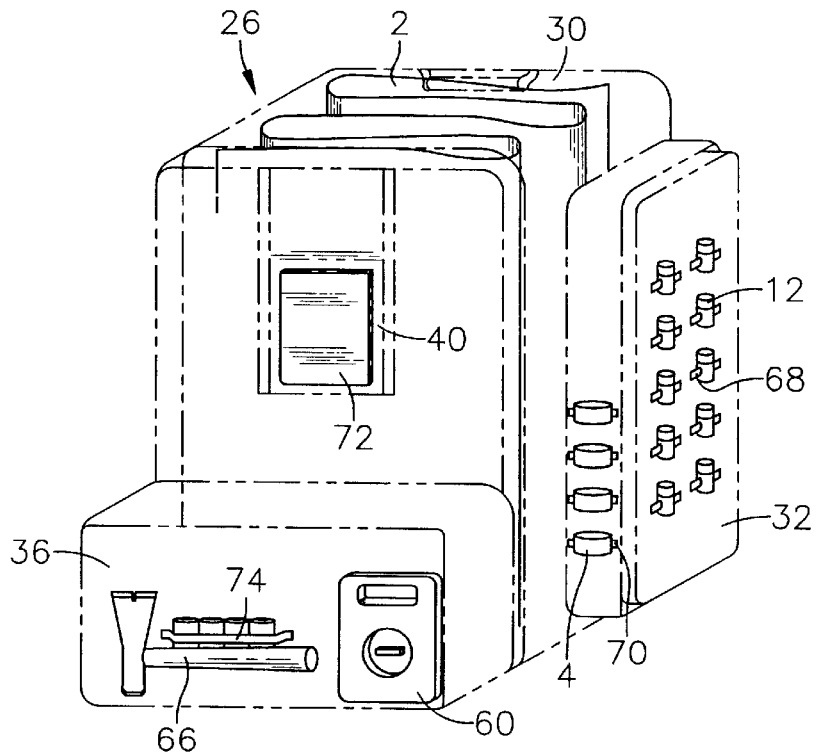
FIG. 10 is a perspective front view of the inside of the storage container illustrating the placement of the web, illuminating devices, and accessories inside of the container.
Figure 11:
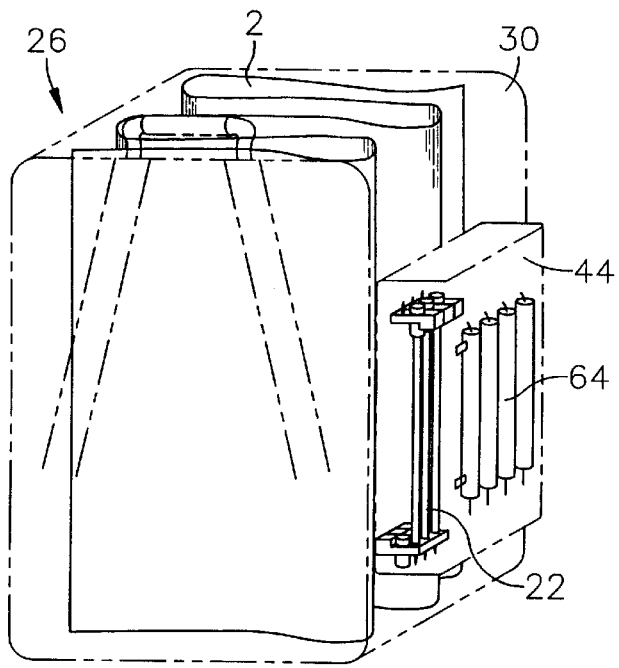
FIG. 11 is a perspective rear view of the inside of the storage container illustrating the placement of the web, ground securement devices and accessories inside of the container.

FIGS. 10 and 11 illustrate typical placement of the web and accessories inside the storage container. Accordingly, in FIGS. 10 and 11, compartment 30 is suitable for containing the web 2. The web 2 may be folded or otherwise packed so that it readily fits into compartment 30.

Side compartment 32 of FIG. 10 may contain illuminating devices 12 held in place by web loops 68, and beacons 4 held in place by web loops 70. Both web loops 68 and 70 may be comprised of fabric or other flexible material fixedly attached to the inside surface of compartment 32 adjacent to compartment 30.

Compartment 40 may be used to contain instruction manual 72. Compartment 36 may be used for storing measuring device 60, hammer 66, and batteries 74 or any other desired accessories.

In FIG. 11, the storage of elongate rigid members 22 and wind direction indicators such as flares 64 or wind socks in side compartment 44 is illustrated.

Other accessories, too numerous to mention, may also be carried in the storage container to assist in the survival and rescue of personnel.

The present invention having been described in its preferred embodiments is thus susceptible to numerous variations within the ability of those skilled in the art and without the exercise of inventive facility. Accordingly variations of this invention are within the spirit and the scope of the appended claims.

What I claim is:

1. A ground position indicator and signaling device for signaling airborne personnel comprising a substantially pliable heavy, open weave web having a triangular shape with a length ratio of sides to base of at least about 1.5:1 for deployment upon ground including a contrasting arrow on the web and means for contrast between the web and the ground, which contrast means provides a high degree of visibility to the airborne personnel who are in an overhead position adjacent to the ground upon which the web is deployed.

2. The device of claim 1 wherein the web is formed from fiberglass mesh.

3. The device of claim 1 wherein the contrasting arrow is attached to the web.

4. The device of claim 1 wherein the contrast means is comprised of a plurality of illuminating devices attached to the web.

5. The device of claim 1 wherein the means for contrast between the web and the ground is provided by coloration of the web such that the web is highly visible by the airborne personnel who are in a location adjacent to the ground upon which the web is deployed.

6. The device of claim 1 wherein the contrast means is provided by coloration of the web and by a plurality of illuminating devices attached to the web.

7. The device of claim 1 further comprising ground securement means for securing the web to the ground.

8. The device of claim 7 wherein the ground securement means comprises a plurality of apertures in the web and a plurality of elongate rigid members for insertion through the apertures in the web and into the ground.

9. The device of claim 7 wherein the ground securement means comprises a plurality of masses attached to the web.

10. The device of claim 7 further comprising a measuring device for attachment to one of the elongate rigid members inserted in the ground for determining a safe landing area for helicopters.

11. The apparatus of claim 10 wherein the contrast means is provided by coloration of the web and by a plurality of illuminating devices attached to the web.

12. The device of claim 1 further comprising a container for storing and readily transporting the web to remote locations.

13. A ground position indicator apparatus and signaling device for airborne personnel comprising a substantially pliable heavy, open weave web having a substantially triangular shape for deployment upon ground including a contrasting arrow on the web and means for contrast between the web and the ground which contrast means provides a high degree of visibility to the airborne personnel who are in an overhead position adjacent to the ground upon which the web is deployed; a ground securement means for securing the web to the ground; and a container for storing and readily transporting the web and ground securement means to remote terrestrial locations.

14. The apparatus of claim 13 wherein the web is formed from fiberglass mesh.

15. The apparatus of claim 13 wherein the contrasting arrow is attached to the web.

16. The apparatus of claim 13 wherein the ground securement means comprises a plurality of apertures in the web and plurality of elongate rigid members for insertion through the apertures in the web and into the ground.

17. The apparatus of claim 13 further comprising a measure device for attachment to one of the elongate rigid members inserted in the ground for determining a safe landing for helicopters.

18. A portable ground position indicator apparatus and signaling device for airborne personnel comprising, in combination a substantially pliable fiberglass mesh web having a substantially triangular shape for deployment upon ground containing means for selectively indicating direction and means for contrast between the web and the ground which contrast means provides a high degree of visibility to the airborne personnel who are in an overhead position adjacent to the ground upon which the web is deployed; ground securement means for securing the web to the ground; and a container for storing and readily transporting the web and ground securement means to remote locations.

19. The combination of claim 18 wherein the means for selectively indicating direction is comprised of a contrasting arrow attached to the web.

20. The combination of claim 19 wherein the contrast means is provided by coloration of the web and by a plurality of illuminating devices attached to the web.

21. The combination of claim 20 wherein the ground securement means comprises a plurality of apertures in the web and a plurality of elongate rigid members for insertion through the apertures in the web and into the ground.

22. The combination of claim 18 further comprising a measuring device for attachment to one of the elongate rigid members inserted in the ground for determining a safe landing area for helicopters.

* * * * *

UNITED STATES PATENT AND TRADEMARK OFFICE
CERTIFICATE OF CORRECTION

PATENT NO : 5,832,867
DATED : Nov. 10, 1998
INVENTOR(S): Charles N. Whicker, Jr.

It is certified that error appears in the above-identified patent and that said Letters Patent are hereby corrected as shown below:

Column 3, line 62, change "plain" to --plan--;

Column 3, line 65, change "plain" to --plan--;

Column 4, line 4, change "respective" to --perspective--;

Column 4, line 7, change "plain" to --plan--;

Signed and Sealed this

Sixth Day of April, 1999

Q. TODD DICKINSON

*Attest:*

*Attesting Officer*    *Acting Commissioner of Patents and Trademarks*